Aug. 31, 1943.  E. I. SCHINDLER  2,328,169
MEANS FOR INSTRUCTING BY HISTOPHONETICS
Filed Aug. 1, 1940
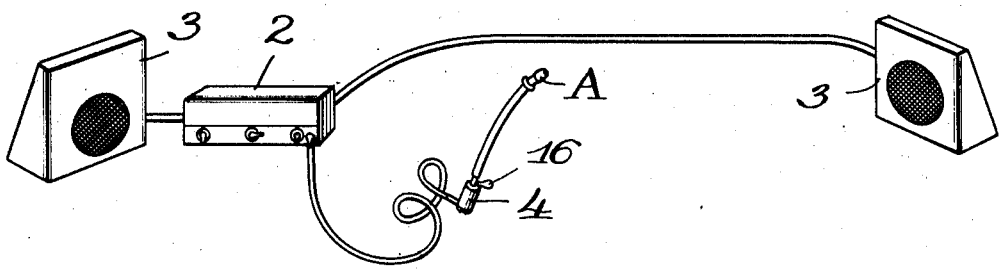
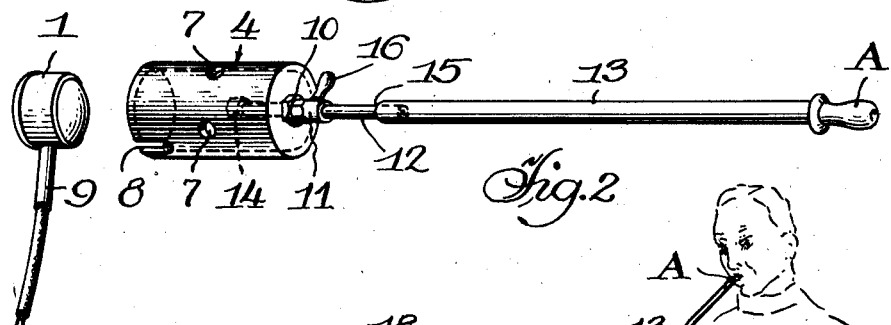
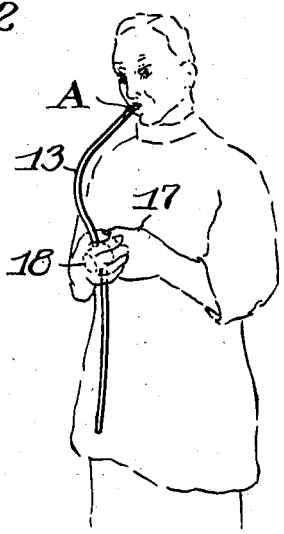
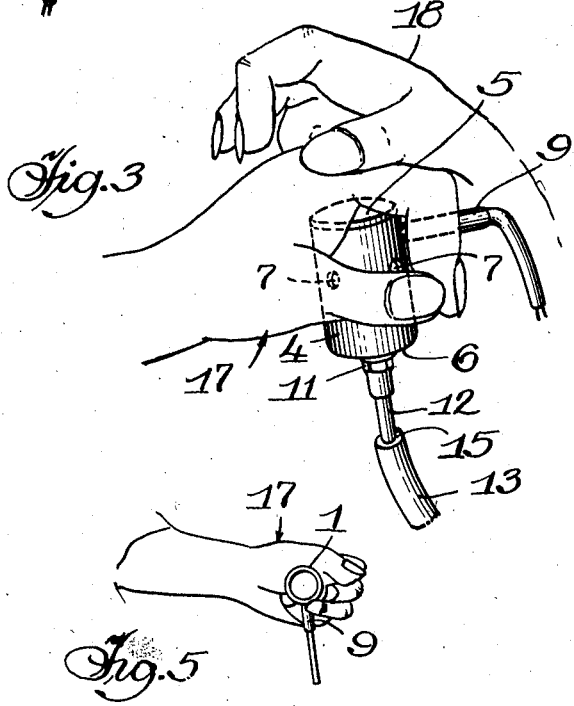
INVENTOR.
BY Erwin I. Schindler
ATTORNEYS.

Patented Aug. 31, 1943

2,328,169

UNITED STATES PATENT OFFICE 2,328,169

MEANS FOR INSTRUCTING BY HISTOPHONETICS

Erwin L. Schindler, Kansas City, Mo.

Application August 1, 1940, Serial No. 349,091

2 Claims. (Cl. 35—17)

The present invention relates to a novel means for instructing or lecturing on the normal and abnormal functioning of certain tissues and organs of the body by sound recreation or sound effects whereby to reproduce the normal and abnormal sounds emanating from such tissues and organs. This imitating or simulating of the sound recreation is particularly adapted for instructing or lecturing on the cardiovascular system which may be covered by the term "cardiophonetics," and on the respiratory system which may be referred to by the term "pneumophonetics."

It is well known that in the course of normal and abnormal functioning of certain tissues and organs of the body, certain specific sounds are given forth, which I have been able to closely imitate by sound effects for the purpose of recreating, in the listening brain, the impression of the actual sound heard of the functioning tissue or organ. By my method, I simulate these normal and abnormal sounds heard in tissues and organs, as distinguished from obtaining these sounds directly from the tissue or organs from which they issue.

To supply a more adequate facility of education, not only to students of the healing art but to practitioners in the field and to the public, I have developed sound effects to recreate those specific sounds of tissues and organs ordinarily elicited by means of the stethoscope. My method differs from the existing methods of amplifying sound and graphic recordings of those sounds emanating from tissues and organs, in the particular that I recreate by imitation these sounds issuing from tissues and organs by sound effects wholly independent of clinical material or living subject matter. If desired, these effects may be recorded, as by means of phonograph or graphic recordings, for use in health programs on the radio or lecture platform. The older methods of individual stethoscope and the multiple stethoscope proved time consuming and rarely portrayed adequately the auscultatory findings and led to discouraging and disappointing results. Even with the new methods of amplifying stethoscope and electric stethoscopes, the vagaries of clinical material continue to present harassing problems. Furthermore, my method being independent of clinical material or living subject matter, eliminates entirely the emotional factor.

In order to more fully appreciate these normal and abnormal sounds that issue from living subject matter, it is essential that an understanding be had of these conditions. Those of the cardiovascular system may be classified as follows:

I. Normal Heart Sounds

In the heart normally, during its functions of receiving and filling with blood, followed by its contraction and expulsion of blood, certain well defined sounds are produced, which are commonly designated the first, second and third sounds of the heart. These sounds appear in a regular sequence, at a regular rate. The frequency of sound groupings per minute is spoken of as the rate of the heart. The relation of individual sounds to each other with their associated rest period is designated the rhythm of the heart. The sequence of one rhythmic pattern is called a cardiac cycle. The cardiac cycle, therefore, from a sound aspect, is represented by the appearance of two or three sounds in a sequence, separated by intervals of silence. These sound sequences, with their intervals of silence, recur over and over as the heart, through its pumping action, maintains the circulation.

The several factors involved in these heart sounds are as follows:

1. *Rate.*—The groupings of sounds of the heart per minute is spoken of as the rate, such as 72 per minute in the average adult heart when the body is at rest.

2. *Heart cycle.*—The grouping of the heart sounds of two, three or more in a sequence, which repeat over and over again, carries the term "heart cycle" to represent each grouping and is usually associated with the single pulse beat.

3. *Rhythm.*—The relation of these individual sounds in each heart cycle to each other makes up the rhythm of the heart.

4. *Character of heart sounds.*—Each heart sound of each heart cycle possesses individual characteristics of pitch, intensity or volume, quality and duration, and by these individual characteristics are recognized.

5. *Mechanism.*—The normal heart sounds are ascribed to the following qualities:

(a) Muscular quality of the contracting heart muscle;

(b) The valvular quality of the closure of the valves within the heart and the valves immediately outside the heart in the great vessels;

(c) The rush of blood into the heart with its impact against the inner walls of the heart chambers and the movement from one chamber to another and out into the great vessels.

II. ABNORMAL HEART SOUNDS

In abnormal conditions the normal factors set out above are disturbed as follows:

1. *Disturbance in rate.*—When the rate per minute is increased or decreased above or below the average, we have a condition classified as rate abnormality and when fast, receives the term "tachycardia" and when slow, receives the term "bradycardia."

2. *Disturbance of rhythm.*—When the normal sequence of sounds in each cycle is disturbed, it is spoken of as "arrhythmia" as a general term, with many subdivisions, depending upon the disordered arrangement of the relationship of sounds and silence in each heart cycle. Illustrations of such arrhythmias are found in the terms "phasic arrhythmia," "premature beats" and "fibrillation."

3. *Abnormalities of character of heart sounds.*—The pitch of the heart sounds and their intensity may be increased or decreased as in cases of high blood pressure, low blood pressure, enlarging of the heart due to increased strength of the heart muscle as in hypertrophy or decreased strength of the heart muscle as in dilatation.

4. *Abnormal mechanism.*—(a) When the muscular factor is markedly altered as in profound weakness or enlarging of the heart mass, there is an alteration in the sounds of the heart.

(b) When the valves within the heart or immediately outside the heart in the great vessels become diseased or the valve orifices dilated, abnormal sounds are produced, commonly called murmurs, and have a definite time relation in the cardiac cycle.

(c) The rush of blood into the chambers, when the heart is dilating, wherein the chambers are widened, produce an abnormal sound.

(d) When disease of inflammation of the covering of the heart, the "pericardium," occurs, interfering with the smooth, silent, frictionless movement of the covering of the heart, an abnormal sound results commonly referred to as the friction rub.

(e) When an abnormal opening develops in the partitions of the heart chambers (as patent foramen ovale or deficient septum) or between the great vessels immediately outside the heart (as patent ductus arteriosus), abnormal sounds are produced of a characteristic nature.

The normal and abnormal heart sounds noted above and others too numerous to illustrate I have been able to recreate by sound effects in such a way as to give the impression to the hearing brain of the actual normal and abnormal heart sounds of the body.

Normal heart sounds with volume variation

Usually the heart sounds are heard as "diphasic," commonly designated the rhythmic couplet of the heart and referred to as the systolic or first sound and the diastolic or second sound.

With cardiophonetics, this difference in the quality of the systolic and diastolic sounds as heard at the apex can be clearly demonstrated with gratifying reproduction of the normal.

At the base of the heart in most instances we hear with our stethoscope the diastolic sound dominant with the systolic sound more distant. This too can be clearly portrayed by cardiophonetics and by demonstrating apex and base sounds in relation to each other, the beginner grasps an early basic principle in learning normal characteristics in applying his stethoscope. In being able to reveal contrasting intensities at the base as normally heard in early childhood when the pulmonary is accentuated over the aortic and in declining years when the reverse is true, we have a valuable aid in cardiophonetics in bringing the sound characteristics of these age groups to the hearing mind of any size audience without the necessity of having to depend on individual clinical material.

Fetal heart sounds

It is highly instructive to have in cardiophonetics a means of demonstrating the fetal heart sound in contrast to the maternal heart sounds. This may be readily demonstrated by giving the maternal heart sounds and rhythm of a rate of approximately 75 per minute with its clarity of tone as heard over the precordium, and then offer the much more rapid fetal heart sounds as heard through the abdominal wall as remote and faint, resembling somewhat the ticking of a watch beneath a pillow.

Disturbances of rhythm

1. *Respiratory phasic arrhythmia.*—In this condition, so common in childhood normally, we have a transitory acceleration of heart rate during inspiration which is the opposite ordinarily found in the average adult where a sustained breath usually slows the heart. With cardiophonetics, I introduce the normal rate and then show how during inspiration it becomes accelerated and slows down again to the starting rate with expiration.

2. *Premature beats or systoles.*—This is the most common disturbance of rhythm and for brevity we will use the term "presystole." In this condition the abnormal cardiac cycle appears prematurely and may arise from an irritable focus in auricle, ventricle or junctional tissue.

I begin by demonstrating the sphygmic or pulse characteristics of presystoles in which, by introducing a few regular beats, I show how the presphygmia occurs by bringing these two beats close together, followed by the compensatory pause. Then by demonstrating the normal cardiac cycle, I lead up to the presystole, in which I may have one or the other of two characteristics. First, I have presystole with omission of the diastolic sound of semilunar closure. Here we may say that we have three sounds grouped together, followed by a compensatory pause, the first two sounds representing the normal cardiac couplet followed by the presystole with dropped semilunar closure. The presystole comes as an unexpected premature sound that is thrown in bold relief by the compensatory pause, when prolonged silence ushers in the subsequent normal cardiac cycle. In the second type of presystole we have the presence of the diastolic sound of semilunar closure and the ear gets the impression of a grouping of four sounds, the first two being the normal cardiac cycle followed by the premature two sounds of the presystole, followed by the compensatory pause. The electrocardiogram is depended upon to reveal the irritable focus from which the presystole may arise, as auricle, ventricle or junctional tissue.

3. *Sinus tachycardia.*—In this condition we have an acceleration of rate from approximately 100 to 140 per minute with the site of impulse initiation in the pace maker (sino-auricular-node). I start the demonstration and lecture by portraying a normal rate of the heart of approximately 75 per minute and then step-up the rate to approximately 120, to show how hyperthyroidism, for example, will often give me a sinus tachycardia. As a dramatic therapeutic gesture, I give the sinus tachycardia as it appears before treatment and then one followed by favorable response under treatment, in which the rate returns to a normal level.

4. *Sinus bradycardia.*—In this condition we have the slow heart in which the pace maker is emitting impulses at a much slower rate than normal. I start the demonstration by giving the normal rate of approximately 75 per minute and gradually slow down the rate to approximately 40 per minute as may occur in a heart exposed to digitalis therapy. It is impressive to show how, when digitalis intoxication is removed, the rate returns to normal level.

5. *Auricular fibrillation.*—Second in the order of frequency of arrhythmias is auricular fibrillation, which is characterized by absolute and complete irregularity of rhythm, rate and volume. There is usually disproportion between the pulse rate and the cardiac rate, known as pulsus deficit. This rhythmic disorder gives the impression of the fluttering of a bird held in the hand.

By means of cardiophonetics I start the illustration with a normal rate and rhythm and then demonstrate systolic and diastolic sounds absolutely and totally irregular, wherein no two beats are alike and showing a wide variation of intensity. Many of the ventricular contractions are too weak to produce the diastolic semilunar closure sound and hence do not register at the radial artery to palpation. The rhythmic disturbance is quite characteristic and when once heard, is not easily forgotten.

6. *Heart block.*—Third in the order of frequency of rhythmic disturbances is heart block. The pulse reveals dropped beats, synchronous with the complete omission of both systolic and diastolic heart sounds. The ear is startled by the impression that momentarily the heart ceased to beat. By means of cardiophonetics I show the normal rate of rhythm of the heart and then the dropped beat, wherein neither systolic or diastolic sound is heard.

7. *Paroxysmal tachycardia.*—As the name implies, this condition presents a very rapid cardiac action with a rate between 180 and 200 per minute, that comes on suddenly and ceases suddenly. The rhythmic couplet is not disturbed and when heard by means of cardiophonetics, gives the impression of an extreme tachycardia.

8. *Pulsus alternans.*—In this grave condition, usually suggestive of advanced myocardial damage, we have a pulse giving us alternating weak and strong beats, while the heart sounds give us a strong cardiac cycle followed by a weak cycle. By means of cardiophonetics, I can portray these alternating strong and weak cardiac cycles with varying rates, and contrast this disturbance of conduction with the more common arrhythmias. In this way the hearing mind is educated to differentiate with ease what otherwise would be a maze of confusion.

9. *Tic-tac rhythm.*—This rhythm of advanced myocardial damage in acute or chronic myocarditis can be portrayed by cardiophonetics in a dramatic fashion to introduce the hour of death. The rate of the heart often increases but the quality of tone is its distinguishing feature. The systolic sound loses its muscular quality and becomes like the second sound and almost indistinguishable from it, especially with rapid rates. The weak quality, which sounds distant to the listening ear, gradually fades out of the picture, growing so weak that it raises a question whether it is the vibrations lingering on in the mind or the feeble heart sending forth its waning final impulses.

Heart murmurs

The painstaking study by means of the single or multiple stethoscope for each individual of a class to listen to the clinical presentation of a murmur can now be obviated by cardiophonetics, by which the common murmurs can be reproduced with clarity and precision.

1. *Systolic murmurs.*—By starting the demonstration with normal heart sounds and rhythm, calling attention to each phase of the cardiac cycle and then impressing upon the first sound a typical murmur, the instructor knows without question that the listening student body is hearing the systolic murmur. I start demonstrating the murmur with increased volume out of all proportion until the hearing mind recognizes the abnormality and then it is toned down to varying degrees of softness to reproduce the sound as heard by means of the stethoscope. Thus we have in conditions with systolic murmurs the veiled first heart sound, clouded with the impurity that we recognize as the murmur, followed by the pure second sound or diastolic semilunar closure and the diastolic pause or silence. The rate can be varied showing how much more difficult it is to discern a murmur in a rapid heart than one with normal or slow rate.

2. *Diastolic murmur.*—When I demonstrate the diastolic murmur, the normal cardiac cycle is introduced and then the second sound is veiled by the impurity that is recognized as the murmur and differentiation made by the fact that the first sound or systolic sound is pure, followed by the murmur and then the diastolic pause or silence.

3. *Middiastolic murmur.*—It seems the timing of this murmur is most difficult for the average student to recognize. I start the demonstration by introducing the normal heart sounds, labelling each as systolic and diastolic, and then introduce the middiastolic murmur which takes place as a very short impurity in the interval of silence ordinarily occurring between the diastolic sound and the systolic sound. Attention is called to the important sound differentiation by the fact that a brief interval of silence immediately preceding the murmur and following the diastolic sound occurs on the one hand, with an equally brief interval of silence following the middiastolic murmur and preceding the systolic sound on the other hand. This murmur is characteristic of mitral stenosis and remains as a telltale evidence of the valvulitis when auricular fibrillation complicates rheumatic valvulitis.

By the use of cardiophonetics, the facility is afforded of slowing down the rate of the heart beat to a point slow enough so that when the middiastolic murmur is introduced, the short silent interval before and after the murmur can be made apparent. In this way the hearing brain is made aware of the basic sound differentiation so that with faster rates the murmur will still be recognized.

4. *Presystolic murmur.*—Next to middiastolic murmur, the presystolic murmur ranks as a stumbling block in ready recognition in the timing of heart murmurs. This murmur immediately precedes the first sound of systole and works up to it and is terminated by the advent of systole and has somewhat of a purring quality. With cardiophonetics, I introduce the normal heart sounds to impress the hearing mind with its rhythm, rate and quality and then introduce the murmur at the close of the diastolic period of silence, immediately preceding systole and terminated by it.

5. *Congenital murmurs.*—Here we have a continuous abnormal sound usually with systolic accentuation. By means of cardiophonetics, I start the demonstration with the normal heart sounds as a background and then introduce the continuous murmur, which is striking and characteristic in that there is usually no silent period.

Further objects, advantages and capabilities will later more fully appear or are inherent in the novel means.

In the drawing:

Fig. 1 is a view in perspective of my equipment.

Fig. 2 is a view in perspective of a microphone and the novel cylinder and tubing for permitting the instructor or operator to blow into the cylinder to simulate certain sounds or murmurs.

Fig. 3 is a view in perspective showing the manner of holding the cylinder and microphone with the hands positioned to simulate the desired sounds.

Fig. 4 is a view in perspective of the mouthpiece adjusted for operation.

Fig. 5 is a perspective view showing the manner of holding the microphone when the cylinder is not employed.

Referring more particularly to the novel means disclosed in the drawing, the invention comprehends the use of a microphone-amplifier-speaker system whereby the simulated or imitated sound effects may be carried to a listening audience or lecture hall from a lecture platform or by radio. The illustrative embodiment comprises a microphone 1 connected through an amplifier unit 2 to any desired number of loud speakers 3 suitably located at convenient places in the room or hall so that the simulated sound effects may be amplified and transmitted to a listening audience.

In the recreation of the desired sound effects, the microphone may be enclosed within a cylindrical member 4 having removable end caps 5 and 6. The barrel or body of the cylinder is perforated at 7 and slotted adjacent one end thereof at 8 to receive the cord 9 of the microphone 1 and this microphone is inserted in this slotted end with its sensitive side or operative face projecting into the cylinder. Thus the microphone is held in fixed relation by the cord and the end cap 5. The opposite end cap 6 is provided with a centrally arranged opening and a nut or the like 10 located on each side of the cap, the nuts having openings concentric with the opening in the cap and in which is inserted a metal sleeve or collar 11 which provides a bearing for a metal tube 12, to the outer end of which is connected a piece of flexible tubing 13 having a mouthpiece A of glass or other suitable material. The tube 12 is slidable in the collar or sleeve 11 but its outward movement is limited by a stop member 14 on its inner end and by the shoulder or abutment 15 formed by the flexible tubing at its outer end. A set screw 16 is provided in the collar or sleeve 11 to lock the tube at the desired adjustment.

The cupped left hand 17 serves as a resonator simulating the thoracic cage, with the bones of the hand separated by muscle, skin, fascia, etc., analogous to the ribs and soft tissues of the chest. The fingers of the right hand 18, usually the index, middle and ring fingers, are used as a plexor to strike upon the dorsum of the cupped left hand or dorsum of the wrist or drosum of the forearm, these latter serving as the pleximeter.

In preparing for the demonstration of cardiophonetics operator, who must be an individual well versed in normal and abnormal heart sounds, holds the microphone over his own heart to test the working of the amplifier system and to get the pitch and quality of tone of the heart sounds with its rhythm in his own mind and to peak the attention of the audience, acquainting them with what to expect. Then the microphone 1 is placed in the cylinder 4 at the microphone cap end with the pick-up side projecting into the lumen of the cylinder and the back resting against the cap 5 with the cord fitting into the slot and fastened down to keep the microphone in a fixed position. The cylinder is placed in the cupped left hand in such a way as to allow the left fingers to loosely hold the barrel of the cylinder, so that the microphone cap does not contact the palm of the hand, but allows a varying space between the cap and the skin surface to further accentuate the left cupped hand as a resonator. The holes 7 in the cylinder are usually free from finger tips for demonstration of normal heart sounds and disturbances of rhythm.

The flexible cord and mouthpiece attached to the stem cap serve to recreate heart murmurs by the operator who holds the mouthpiece A between his teeth and blows air into the interior of the cylinder, impressing the sound on the sensitive pick-up surface of the microphone. The pitch of the sound representing the heart murmurs may be changed by sliding the tube back and forth in the cylinder, the highest pitch of sound being obtained when the tube is fully inserted into the cylinder and the lowest pitch when it is fully withdrawn.

A simplified method is to dispense with the microphone attachment and hold the microphone, without any covering, in the palm of the hand and proceed as before. In this simplified method murmurs are reproduced by blowing the breath directly into the cupped left hand through a narrow opening, formed by approximating the ends of the thumb and index fingers.

The fingers of the right hand, usually the index, middle or ring finger, are used as a plexor, striking the proper point on the dorsum of the left hand, wrist or forearm, in such a rhythmic pattern so as to reproduce the rate, pitch, intensity, rhythm and quality of the normal or abnormal heart condition to be reproduced.

I have found by tapping along the dorsum of the left hand with the fingers of the right hand, testing out the interosseous spaces and the metacarpal bones, fairly close to the knuckles (metacarpo-phalangeal junction), the correct tone can be found. The interspace between the middle and ring fingers of the left hand is a good location to contact with the ring finger of the right hand as the plexor, to portray the first heart sound, with its combined muscular and valvular quality. The second heart sound with its purely valvular quality is reproduced nicely by striking with the index finger of the right hand on the dorsum of the summit of the second metacarpo-phalangeal articulation of the left hand.

Either sound can be made loud, soft, short or prolonged with striking fidelity of tone to reproduce the normal heart sounds. By introducing two or three strokes of the plexor upon the pleximeter with properly spaced pauses, any desired cardiac cycle can be recreated. The rate of the cardiac cycle and the rhythm can be varied by the operator according to the condition he wishes to reproduce. By using the index and middle fingers of the right hand on the dorsum of the wrist, with gentle strokes, the weak sounds of the fetal heart can be reproduced with its more rapid rate. Then again the dorsum of the left forearm with the interosseous space and either bone of the forearm, serves admirably to reproduce certain types of heart sounds.

In reproducing the common heart murmurs the stem end is fastened to the end of the cylinder opposite to the microphone and the mouthpiece at the distal end of the flexible tube held between the lips. The fingers of the right hand are used on the dorsum of the left hand to maintain the rate and rhythm, whether normal or abnormal to be reproduced, and the breath is blown through the tube, striking the surface of the microphone inside the cylinder with sufficient force to reproduce, with startling fidelity, the sounds of the common murmurs. By varying the force of the breath and the amount of air injected, and regulating the holes on the cylinder, and the use of the adjustable sliding tube into the cylinder, the exact quality of the murmur to be reproduced can be recreated, whether high pitched, sharp, low pitched, soft, short or long and the timing is synchronized with the heart sounds reproduced by tapping on the dorsum of the hand, forearm or wrist. Thus the common murmurs, systolic in time diastolic, presystolic, middiastolic, continuous or any other, can be accurately and faithfully reproduced. These murmurs can veil the imitated heart sounds as an impurity or replace them entirely. They can be combined with normal or abnormal rhythm.

The friction sounds of the pericardium are reproduced as follows: I detach the cylinder from the microphone end and hold the microphone in the palm of the left hand. I fasten to finger tips of left hand sandpaper, emery cloth or any other suitable roughened surface. By tapping with the finger tips of the right hand on the dorsum of the left hand, to introduce a normal or abnormal cardiac cycle, I reproduce the friction rub by rubbing the covered finger tips of the left hand against the front of the chest, timing it with the recreated cardiac cycle. Another way of producing the pericarditic friction rub is to hold the cylinder with the microphone end in the cupped left hand, remove the stem end and cover the opened end of the cylinder with sandpaper, emery cloth or suitable roughened surface and rub this roughened surface against the front of the chest, timing it with the normal or abnormal cardiac cycle, introduced by tapping with the fingers of the right hand on the dorsum of the left hand.

Similarly, the sounds evidencing the various diseased conditions of the lungs and other organs may be recreated.

In simulating the sound of the pleura in various diseased conditions, a piece of sandpaper is rubbed close to the microphone with varying degrees of force to give the sound of the rasping of the lung tissue against the pleura or lining of the chest cavity.

It will be evident by this novel method of simulation and lecturing, and the means of practical demonstration, I am able to recreate sounds and thereby I am able to more effectively demonstrate to a student body or audience than were each to use a stethoscope and examine a diseased body, or were the actual diseased condition amplified by an electrical system. In order to facilitate concentration, good results have been secured by screening the operator and all of the equipment except the loud speakers from view and the room or lecture hall is darkened to eliminate visual distraction.

Having thus disclosed the invention, I claim:

1. Means for instructing on the diseases of the cardiovascular and respiratory system by recreating and simulating the normal and abnormal heart sounds without the use of clinical material, comprising a microphone-amplifier-speaker system, a housing for encompassing the microphone, openings provided in the housing adjacent the pick-up side of the microphone, and tubing leading into the housing and adjacent the pick-up side of the microphone, said tubing being adapted to be blown into to simulate the sound of heart murmurs.

2. Means for instructing on the diseases of the cardiovascular and respiratory system by recreating and simulating the normal and abnormal heart sounds without the use of clinical material, comprising a microphone-amplifier-speaker system, and a hollow, perforated member surrounding the microphone and adapted to be held in the cupped hand of the instructor with the hand forming a resonator whereby tapping on the back of the cupped hand, wrist or forearm is transmitted through the microphone to simulate the normal and abnormal sounds which would emanate from the body under healthy or diseased conditions, and blowing into the hollow member is transmitted through the microphone to simulate the sound of heart murmurs.

ERWIN I. SCHINDLER.

CERTIFICATE OF CORRECTION.

Patent No. 2,328,169. August 31, 1943.

ERWIN I. SCHINDLER.

It is hereby certified that error appears in the printed specification of the above numbered patent requiring correction as follows: Page 2, first column, line 40, for "of" first occurrence, read --or--; page 4, second column, line 7, for "drosum" read --dorsum--; line 10, after the word "phonetics" insert --the--; and that the said Letters Patent should be read with this correction therein that the same may conform to the record of the case in the Patent Office.

Signed and sealed this 19th day of October, A. D. 1943.

Henry Van Arsdale,
(Seal) Acting Commissioner of Patents.